Feb. 18, 1930.  W. SCHAAKE  1,747,489
CURRENT COLLECTOR
Filed Jan. 25, 1928   5 Sheets-Sheet 1

INVENTOR
William Schaake
BY
*[signature]*
ATTORNEY

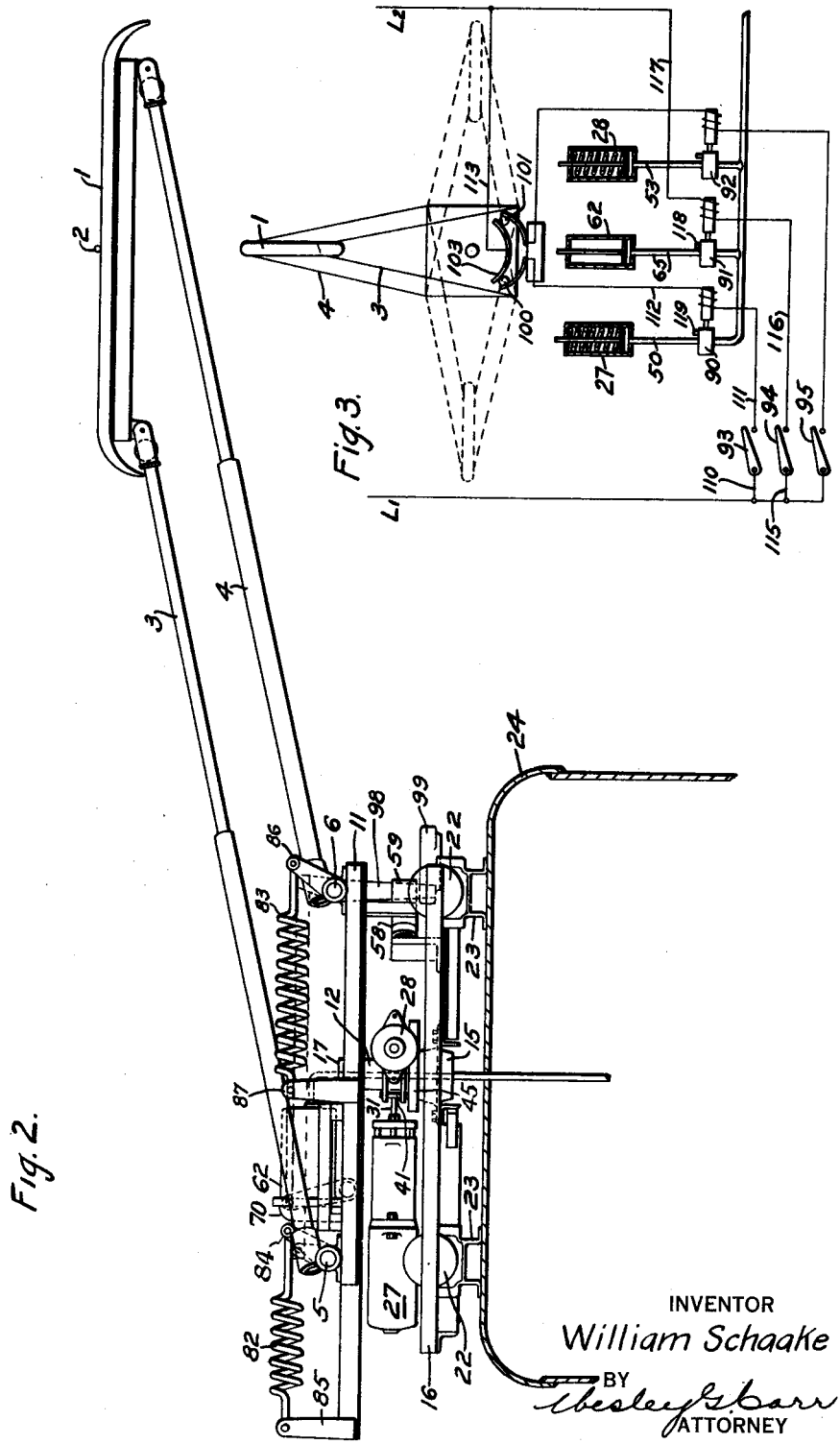

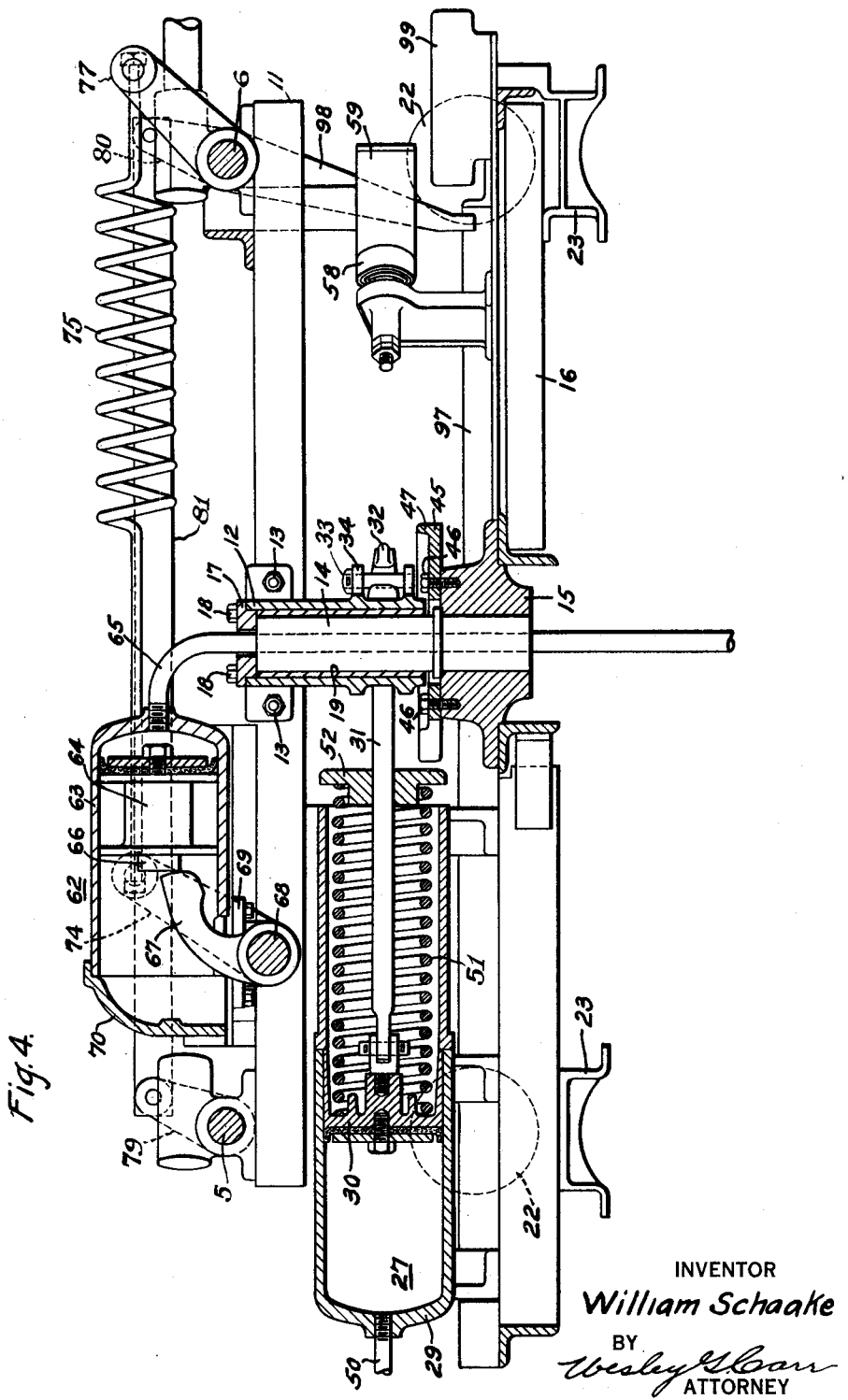

Feb. 18, 1930. W. SCHAAKE 1,747,489
CURRENT COLLECTOR
Filed Jan. 25, 1928 5 Sheets-Sheet 4

INVENTOR
William Schaake
BY
ATTORNEY

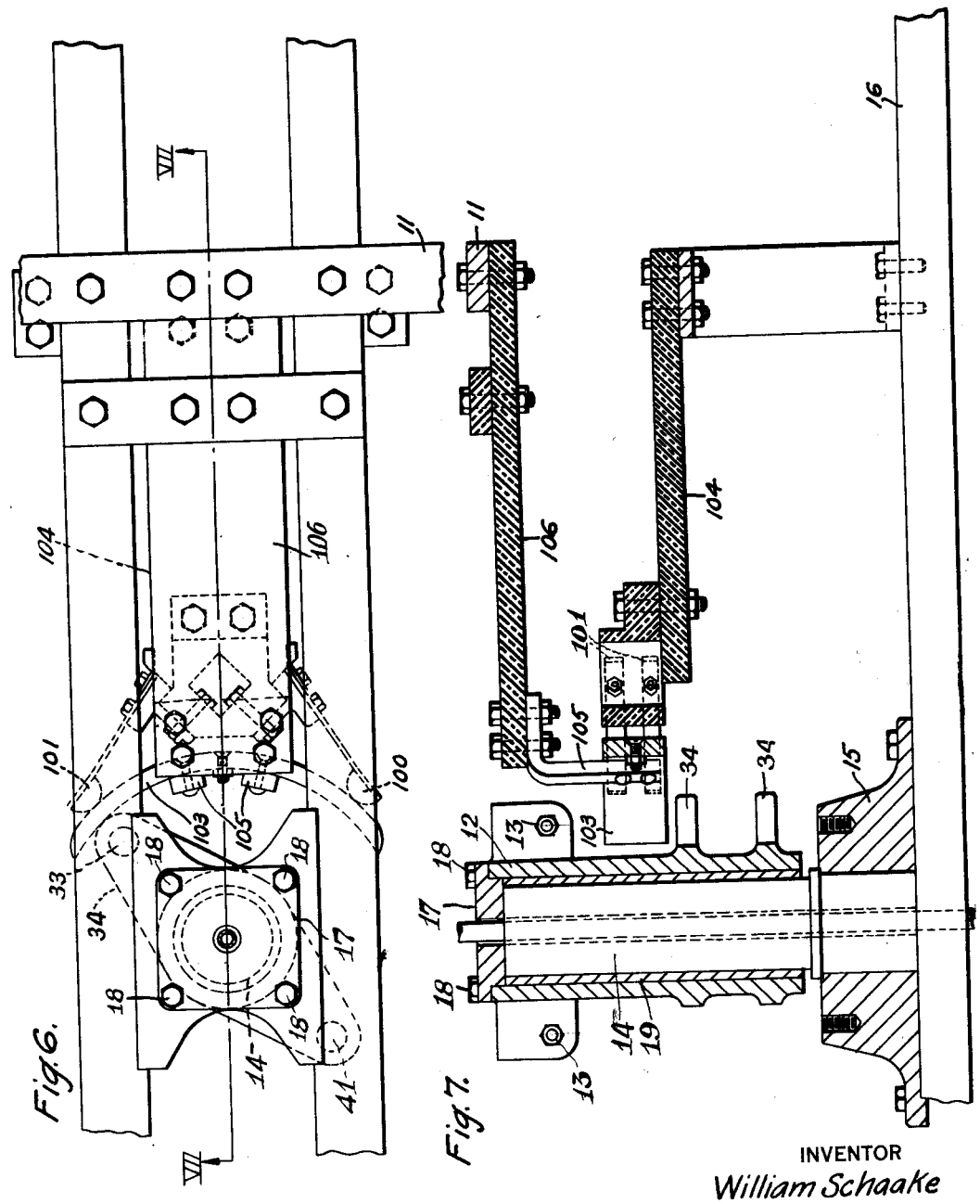

Patented Feb. 18, 1930

1,747,489

UNITED STATES PATENT OFFICE

WILLIAM SCHAAKE, OF PITTSBURGH, PENNSYLVANIA, ASSIGNOR TO WESTINGHOUSE ELECTRIC & MANUFACTURING COMPANY, A CORPORATION OF PENNSYLVANIA

CURRENT COLLECTOR

Application filed January 25, 1928. Serial No. 249,268.

My invention relates to current collectors for electric railway vehicles and more particularly to trolley structures of the side-arm-collector type that are employed in collecting current from over-head trolley conductors which are suspended at the side of the track.

The object of the invention, generally stated, is the provision of a current collector that shall be simple and efficient in operation and adapted for ready and economical manufacture.

A more specific object of the invention is to provide a trolley structure that will occupy a minimum amount of space above the vehicle on which it is mounted, when it is in its lowered position.

Another object of the invention is to provide a trolley structure that may be readily rotated to either side of the vehicle on which it its placed and raised into engagement with a trolley conductor.

A further object of the invention is to provide a trolley structure in which the parts are interlocked in such manner that the trolley cannot be raised until it has been moved from the center of the vehicle to one side thereof.

It is also an object of the invention to provide a trolley structure in which the means for moving the trolley to the one or to the other side are interlocked in such manner that either of the actuating means is rendered ineffective while the other is in operation.

The invention, as disclosed in the accompanying drawings, comprises the structural features and the combination of elements and arrangement of parts which will be herein- after set forth and particularly defined in the claims.

Figure 1:
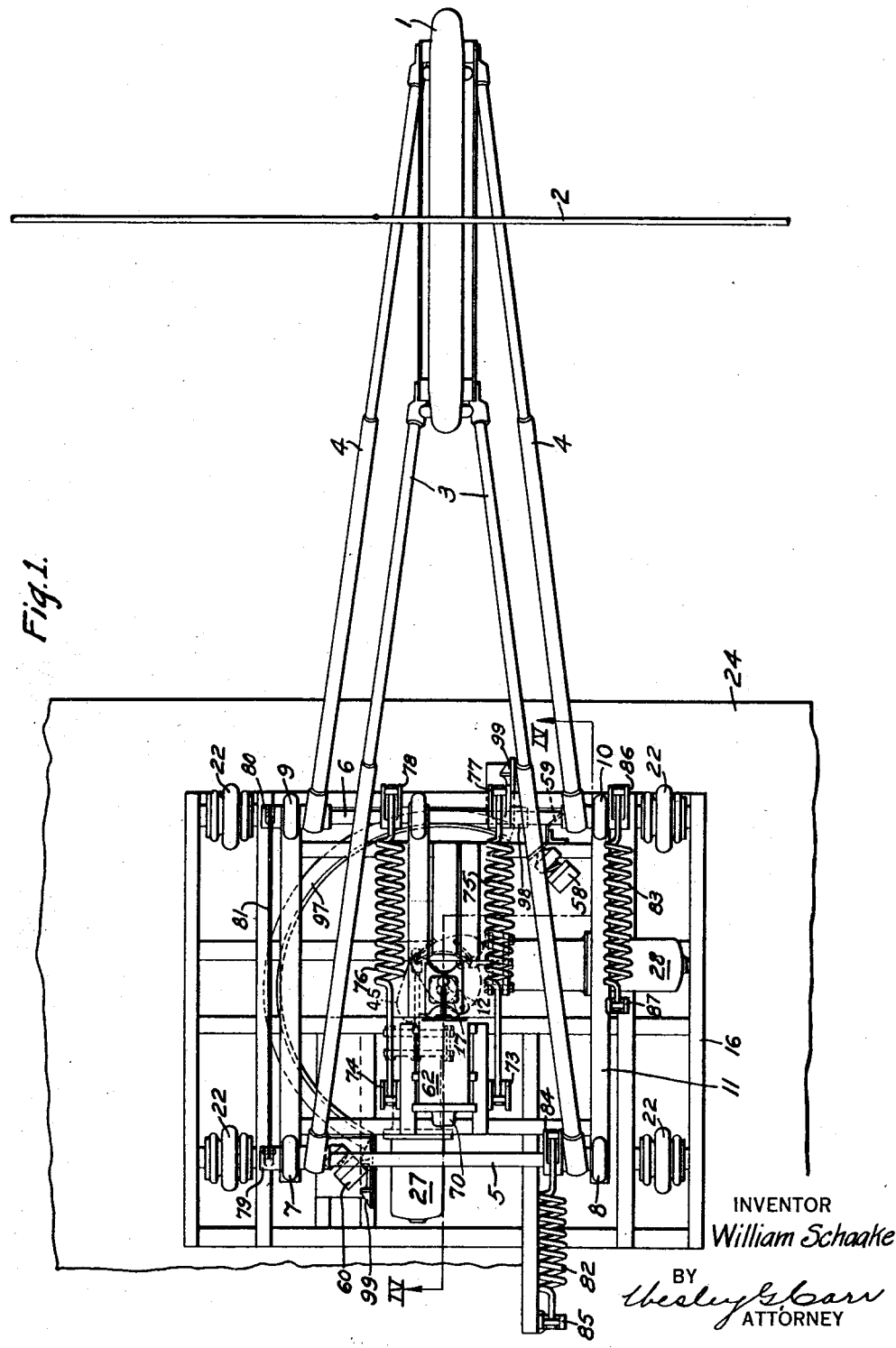
Figure 5:
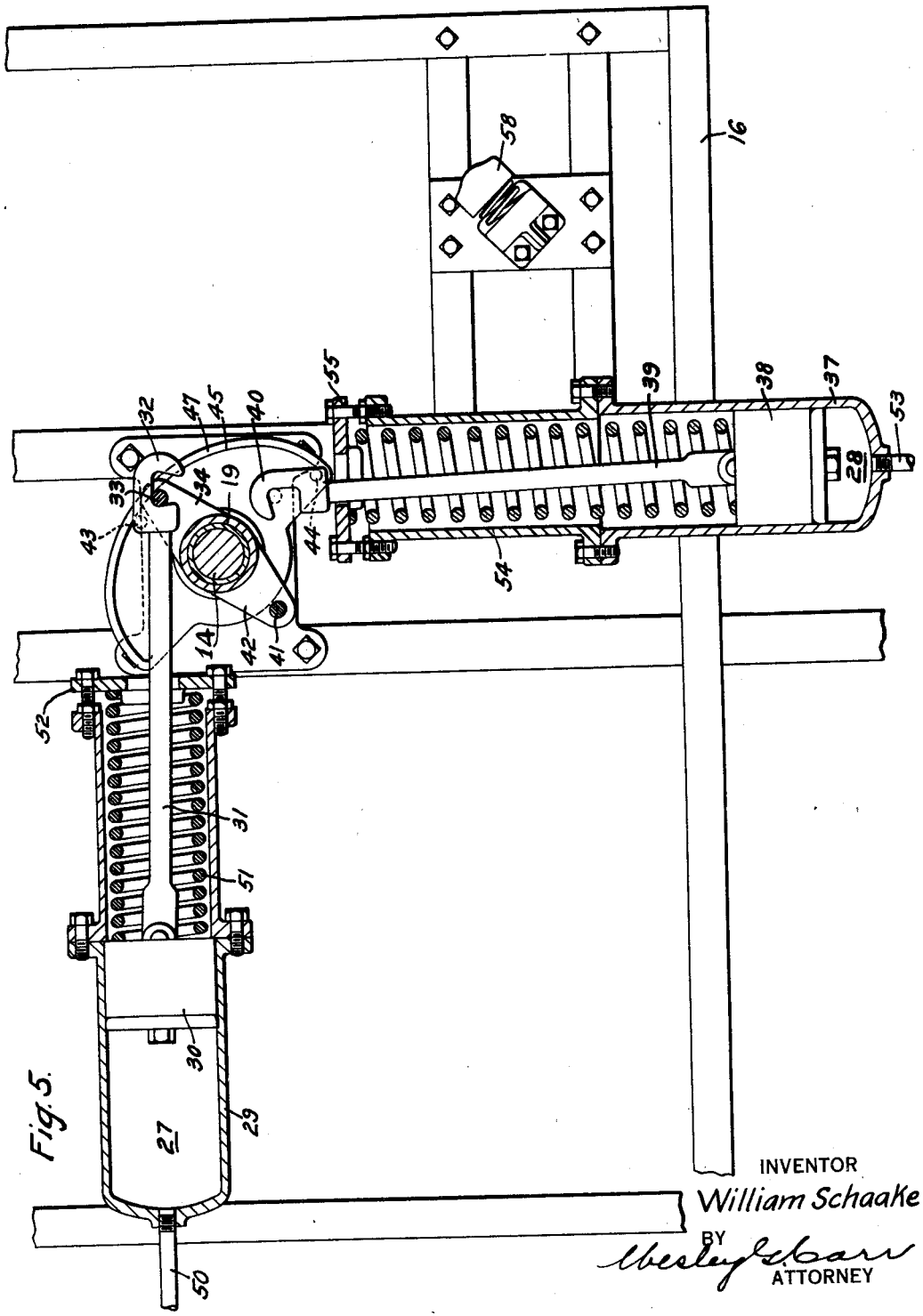

For a fuller understanding of the invention, reference may be had to the following detailed description, taken in connection with the accompanying drawings, in which, Figure 1 is a top plan view of a trolley structure embodying my invention, Figure 2 is a view, in side elevation, of the structure shown in Fig. 1, Figure 3 is a diagram representing the trolley structure and the means for controlling its operation, Fig. 4 is a view, in section, taken along the line IV—IV of Fig. 1, Fig. 5 is a view, partly in horizontal section and partly in plan, of an actuating device for moving the trolley to either side of the car, Fig. 6 is a plan view of the switch that is attached to the trolley structure for interlocking the electric system which is employed in controlling the operation of the means for moving the trolley sideways, and Fig. 7 is a view, in section, taken on the line VII—VII of Fig. 6.

The trolley structure illustrated in the drawings is provided with a sliding contact shoe 1 for engaging a trolley conductor 2. The contact shoe is mounted in a horizontal position on the upper ends of a pair of parallel trolley poles 3 and 4. The lower ends of the trolley poles are secured to, and supported on, a pair of operating shafts 5 and 6 which are rotatably mounted in a plurality of bearing brackets 7, 8, 9 and 10 on a trolley frame 11.

Inasmuch as the operating shafts 5 and 6 are disposed in parallel relation in a horizontal plane, and each of the trolley poles 3 and 4 comprises a V-shaped unit, one trolley pole will lie within the other, in a nested relation, when they are lowered, thereby occupying a minimum amount of space above the vehicle on which they are mounted.

The trolley frame 11 is provided with a centrally disposed hub member 12 that is secured to the central portion of the frame work by means of bolts 13. As shown, the hub member 12 fits over a vertical center pin 14 which is mounted in a casting 15 that is bolted to the central portion of a trolley base or supporting frame 16. A cap 17 is secured to the upper end of the hub member 12 by a plurality of bolts 18 in such manner that it rests upon the upper end of the center pin 14 and provides a means for carrying the weight of the trolley frame 11 and the parts supported by it with as little friction as possible. A bushing 19 is disposed in the hub member 12 to engage the center pin 14 and provides a good bearing surface between the two members. It will, therefore, be seen that the hub member 12 and the center pin 14 cooperate to maintain the trolley frame 11 in a horizontal position but permit it to be rotated freely whenever it is desired to swing the trolley sidewise.

It will also be noted that the parallel trolley poles 3 and 4, the trolley frame 11 and the contact shoe 1 simulate a parallelogram with hinged joints and, therefore, the contact shoe 1 will remain in a horizontal position when in its raised position as well as when it is in its lowered position.

The trolley base or supporting frame 16 is rigidly mounted on a plurality of insulators 22 which are firmly supported on a plurality of brackets 23 that are secured to a roof 24 of an electric locomotive (not shown).

When the trolley is down or in its lowered position, it is carried in a longitudinal position on the roof 24 of the locomotive. Therefore, when it is desired to place the trolley in service, it is necessary to swing it sidewise until the contact shoe 1 is under the trolley conductor and then raise it to its working position. The means for moving the trolley sidewise comprises a pair of fluid actuating devices 27 and 28 that are firmly mounted at right-angles to each other, on the supporting frame 16.

The actuating device 27, which is employed to move the trolley to and from the right-hand side of the car, embodies a cylinder 29, a piston 30 and an operating rod 31. As shown, the cylinder 29 is constructed in two parts in order that it may readily be assembled and disassembled. The inner end of the rod 31 is pivotally connected to the piston 30 and its outer end is provided with a hook-shaped member 32 for engaging a pin 33 that is mounted in a pair of extended arms 34. The extended arms 34 are connected to, and form integral parts of, the hub-member casting 12. Therefore, when the trolley is in its central or neutral position, any movement of the piston 30 and the operating rod 31 will cause the hook-shaped member 32 to engage the pin 33 and swing the trolley to the right-hand side of the locomotive.

The actuating device 28 for swinging the trolley to the left side of the locomotive is disposed at right-angles to the actuating device 27 on the supporting frame 16 and it is provided with a cylinder 37, a piston 38, an operating rod 39 and a hook-shaped member 40 that are similar to those embodied in the actuating device 27. The hook-shaped member 40 is disposed to engage a pin 41 that is held in the outer ends of a pair of arms 42 which constitute integral parts of the hub member 12 and are disposed thereon opposite the arms 34. It will, therefore, be seen that any movement of the hook member 40 by the operating rod 39 will cause it to engage the pin 41 when the trolley is in a neutral position and thereby swing the trolley to the left side of the locomotive.

It will be noted that it is possible to move the trolley over a path extending through an angle of 180° and, therefore, that it is necessary to provide hook-shaped members of such construction that one of them will be disengaged from the hub member 12 when the other one is in operation. This is accomplished by providing each of the hook-shaped members 32 and 40 with an opening in its one side, thus permitting the pin 41 to leave the hook member 40 when the trolley is moved to the right side and, likewise, permitting the pin 33 to leave the hook member 32 when the trolley is moved to the left side. Inasmuch as the hook-shaped members 32 and 40 are out of engagement with the pins 33 and 41, at various times, it is necessary to provide means for supporting them in their pin-engaging positions. Therefore, the hook members 32 and 40 are provided on their under-sides, with pins or studs 43 and 44, respectively, which rest on, and are supported by, a semi-circular plate 45 that is mounted on the central casting 15 by means of a plurality of bolts 46. The plate 45 is provided with a rim 47 that engages the sides of the pins or studs 43 and 44 and thereby forces the hook members 32 and 40 to travel in curved paths corresponding to the curved paths of the pins 33 and 41 on the hub member 12.

The piston 30 in the actuating device 27 may be actuated to move the trolley to the right side of the car by the admission of compressed air to the cylinder 29 through a pipe 50. The means for actuating the piston 30 to return the trolley from its position on the right of the car to its central position comprises a compression spring 51 that is mounted between the bottom of the piston and a bearing plate 52 which is disposed on the outer end of the actuating device 27.

Similarly, the piston 38 in the actuating device 28 may be actuated to move the trolley to the left side of the locomotive by the admission of compressed air to the cylinder 37 through a pipe 53. The means for actuating the piston 38 to return the trolley from its position on the left of the car to its central or neutral position, comprises a compression spring 54 that is mounted between the bottom of the piston and a bearing plate 55 which is mounted on the outer end of the actuating device 28.

A spring bumper 58 is mounted on the right portion of the supporting frame 16 in a position to be engaged by a bumper plate 59 on the trolley frame 11 to limit the travel of the trolley. A similar spring bumper 60 is located on the left-hand portion of the supporting frame 16 to engage the other side of the bumper plate 59 and stop the trolley when it is moved to the left side of the car.

The means for raising the trolley to a position where it will engage a trolley conductor, comprises a fluid-actuating device 62 that is mounted on the trolley frame 11. The device 62 comprises a cylinder 63 and a piston 64 that is disposed therein to be operated by compresed air which may be admitted through a pipe 65. A cover plate 70 fits over the outer end of the cylinder 63 and protects it from dust and dirt.

The piston 64 is provided with a boss 66 on its outer end which engages a lever 67 that is rigidly secured to a shaft 68 which is rotatably mounted on a bearing 69 on the under side of the cylinder 63. In order that power may be transmitted from the rotatable shaft 68 to the shaft 6, two pairs of arms 73 and 74 are rigidly secured to the ends of the rotatable shaft 68, and the outer ends of these arms are connected, by means of a pair of tension springs 75 and 76, to the outer end of a pair of cooperating arms 77 and 78 that are rigidly secured to the operating shaft 6 carried by the trolley frame 11.

The operating shaft 6 is operatively connected to the operating shaft 5 by means of a plurality of levers 79 and 80 and a connecting rod 81, so that movement of either of the operating shafts will effect a corresponding movement of the other. It will, therefore, be seen that, when the piston 64 is operated by compressed air, the movement will be transmitted to the operating shafts 5 and 6 through the lever 67, the rotatable shaft 68, the arms 73 and 74, the tension springs 75 and 76 and the arms 77 and 78 on the operating shaft 6 and, in such manner, operation of the trolley structure may be effected.

In order to facilitate the raising and lowering of the trolley the weight of the trolley poles and the contact shoe is balanced by means of a pair of balancing springs 82 and 83 that are disposed, under tension, between the operating shafts 5 and 6 and the trolley frame 11. The tension spring 82 is connected between an arm 84 that is rigidly mounted on the operating shaft 5 and a bracket 85 provided on the rear end of the trolley frame 11; while the tension spring 83 is connected between an arm 86 that is rigidly secured to the other operating shaft 6 and bracket 87 carried by a cross member of the trolley frame 11.

The admission of compressed air to the actuating devices for operating the trolley is controlled by a plurality of magnet valves 90, 91 and 92, that are included in a control circuit which is governed by a plurality of switches 93, 94 and 95 (see Fig. 3). Inasmuch as the magnet valves are well known in the art, they will not be illustrated and described in detail. The switch 93 controls the magnet valve 90 which governs the admission of compressed air to the actuating device 27 for moving the trolley to the right.

The switch 94 controls the magnet valve 91 which governs the admission of compressed air to the actuating device 62 for raising the trolley. And the switch 95 controls the magnet valve 92 for governing the admission of compressed air to the actuating device 28 for swinging the trolley to the left side of the car. A supply of energy for the control circuit is obtained from the supply conductors L1 and L2 to which the control circuit is connected.

The trolley is provided with interlocking means for preventing any false operation. A mechanical interlock keeps the trolley from rising until it has rotated 90° from the longitudinal center of the locomotive and also prevents its return to the center until the contact shoe has been lowered. This arrangement prevents entanglement of the trolley shoe with the trolley conductor. An electrical interlock prevents the operation of either of the sidewise actuating devices 27 and 28 when the other is in operation.

The mechanical interlock comprises a curved piece of angle iron 97 that is securely affixed to the upper face of the stationary supporting frame 16 and a cooperating lever 98 that is rigidly secured to the operating shaft 6 on the trolley frame 11. Inasmuch as the lever 98 is firmly secured to the operating shaft 6, it will move downwardly and strike the curved angle iron 97 if any attempt is made to raise the trolley before it reaches one of its side positions. When the trolley is in its side position and ready to be raised, the lower end of the inter-locking lever 98 will pass the end of the curved angle iron plate 97 and permit the trolley to be raised. A bearing plate 99 is disposed at each end of the curved angle iron 97 on the supporting frame 16 to engage the interlocking lever 98 when the trolley is in its raised position and prevent it from being returned to its central or neutral position on the locomotive until it is lowered.

The electrical interlocking means comprises a pair of contact members 100 and 101 that are mounted on the stationary frame 16 and a cooperating contact strip 103 that is carried by the trolley frame 11. The contact members 100 and 101 are mounted on an insulating panel 104 that is bolted to a member of the stationary supporting frame 16 and they are electrically connected in the respective circuits for the magnet valves 90 and 92 for controlling the admission of compressed air to the side actuating devices 27 and 28.

The contact strip 103 is electrically connected to the supply conductor L2 and is held in position to engage the contact members 100 and 101 by a pair of brackets 105 that are secured to an insulating panel 106 which is bolted to the trolley frame 11. As shown, the contact strip is of such length and is disposed on the trolley frame in such manner that it is engaged by both contact members 100 and 101 when the trolley is in a central position, thereby electrical circuits by means of which either of the side actuating devices 27 and 28 may be energized by the closing of its corresponding switch. When the trolley is moved to the right or to the left, the contact strip 103 will revolve with the trolley frame 11 and will move out of engagement with the contact member corresponding to the actuating device for moving the trolley to the opposite side and thereby break the circuit for the magnet valve which controls that actuating device.

The operation of the trolley is as follows: assuming that the trolley is down in a central position on the locomotive, and that it is desired to move it into position to engage a trolley conductor at the right side of the track, then, upon the closing of the switch 93, a circuit will be completed from the supply conductor L1, through conductor 110, switch 93, conductor 111, magnet valve 90, conductor 112, the contact member 100, the contact strip 103 and conductor 113, to the supply conductor L2, thereby energizing the magnet valve 90 and admitting a supply of compressed air to the cylinder 29 of the actuating device 27. The admission of compressed air to the cylinder 29 will force the piston 30 outward against the action of the compression spring 51 and thereby actuate the operating rod 31 and the hook member 32. The hook member 32 will engage the pin 33 on the hub member 12 and thereby rotate the trolley to the right until the bumper plate 59 on the trolley frame 11 engages the spring bumper 58 and stops the movement. When the trolley completes its movement to the right, the interlocking lever 98 is free to pass around the end of the curved angle iron 97. At this point in the operation, the switch 94 is closed, thereby completing a circuit from the supply conductor L1, through conductor 115, the switch 94, conductor 116, the magnet valve 91, and conductor 117, to the supply conductor L2. The completed circuit operates the magnet valve 91 to admit compressed air through the pipe 65 of the cylinder 63 of the upward-actuating device 62. Then the piston 64 moves forward under the force exerted by the compressed air and actuates the lever 67 which, in turn, rotates the shaft 68 and, through the arms 73 and 74, the tension springs 75 and 76, and the arms 77 and 78, rotates the operating shaft 6 and thereby raises the trolley until the contact shoe 1 engages the trolley conductor 2.

The tension springs 75 and 76 effect a cushioning of the upward movement of the trolley thus permitting the contact shoe 1 to follow the trolley conductor regardless of any uneven places in the line.

When it is desired to lower the trolley from its raised position at the right side of the locomotive, the switch 94 is opened to de-energize the magnet valve, 91 and permit it to close. When the magnet valve 91 is closed, the air in the cylinder 63 of the upward actuating device 62 is exhausted through an exhaust opening 118 in the magnet valve and the weight of the trolley, being sufficient to overcome the force exerted by the balancing springs 82 and 83, causes it to be lowered to a horizontal position.

When the trolley reaches the horizontal position, the switch 93 is opened thereby de-energizing and closing the magnet valve 90. The closing of the magnet valve 90 shuts off the supply of compressed air to the side actuating device 27 and permits air in the cylinder 29 to escape through an exhaust pipe 119 in the magnet valve. As the air escapes, the force exerted by the compression spring 51 against the piston 30 becomes effective and causes the piston to actuate the operating rod 31 and the hook member 32 to engage the pin 33 on the hub member 12 and return the trolley to its central position.

If it is desired to move the trolley into position to engage a trolley conductor at the left side of the locomotive, the switches 95 and 94 are closed in sequence and the side actuating device 28 and the upward actuating device 62 operate to move the trolley to the left and then raise it in practically the same manner as described for moving the trolley to the right.

It will therefore be seen that I have provided an improved trolley structure which occupies a minimum amount of space on the roof of the electric locomotive or other vehicle on which it is mounted and which may also be easily moved into or out of engagement with a trolley conductor that is suspended on either side of the track on which the locomotive or vehicle travels. It will also be apparent that I have provided an improved trolley structure in which the moving parts are mechanically and electrically interlocked in such manner that improper operation of the trolley cannot take place.

While the illustrated example constitutes a particular embodiment of my invention, I do not limit myself strictly to the details shown, since, manifestly, the same may be varied considerably without departing from the spirit of the invention as defined in the appended claims.

I claim as my invention:

1. In a current collector adapted to be mounted on a car, the combination with a supporting base, a frame pivotally mounted on said base, and a trolley pole pivotally mounted on said frame, of means for preventing the raising of the trolley pole until the pole is set in predetermined positions on the car and means for moving the trolley pole transversely of the car to set it in said predetermined positions.

2. In a current collector adapted to be mounted on a car, the combination with a supporting base, a frame pivotally mounted on the base, and a trolley pole pivotally mounted on said frame, of means for preventing the raising of the trolley pole when it is located between predetermined side positions and means for moving the trolley pole transversely of the car.

3. In a current collector adapted to be mounted on a car, the combination with a supporting base, a frame pivotally mounted on said base, and a trolley pole pivotally mounted on said frame, of means for moving the trolley pole to either side of the car, means for raising the trolley pole, and an interlocking member for preventing the raising of the trolley pole until it is moved to a side position relative to the car and for preventing movement of the trolley pole from its side position so long as it is in a raised position.

4. In a current collector adapted to be mounted on a car, the combination with a supporting base, a frame pivotally mounted on said base, and a trolley pole pivotally mounted on said frame, of means for moving the trolley pole to either side of the car, means for raising the trolley pole, and an interlocking member for preventing the raising of the trolley pole until it is moved to either side of the car and for preventing movement of the trolley pole from either side position so long as it is in a raised position.

5. In a current collector adapted to be mounted on a car, the combination with a supporting base, a frame pivotally mounted on said base, and a trolley pole pivotally mounted on said frame, of means for moving the trolley pole to either side of the car, means for raising the trolley pole, and a plurality of interlocking members associated with the base and a trolley pole whereby upward movement of the trolley pole is prevented until it is moved to a side position and lateral movement is prevented when in its side position so long as it is in a raised position.

6. In a current collector adapted to be mounted on a car, the combination with a supporting base, a frame pivotally mounted on said base, and a trolley pole pivotally mounted on said frame, of means for moving the trolley pole to either side of the car, means for raising the trolley pole, and a base and the trolley pole whereby upward movement of the trolley pole is prevented until it is moved to either of its side positions and lateral movement from the side position to which it has been moved is prevented so long as it is in its raised position.

7. In a current collector adapted to be mounted on a car, the combination with a supporting base, a frame pivotally mounted on said base, and a trolley pole pivotally mounted on said frame, of means for moving the trolley pole to either side of the car, means for raising the trolley pole, a track member and a projecting member cooperatively associated with the base and the trolley pole for preventing the raising of the trolley pole except when in its side position and the moving of the trolley pole from its side position so long as it is in its raised position.

8. In a current collector adapted to be mounted on a car, the combination with a base and a trolley pole structure comprising a frame pivotally mounted on the base and a trolley pole pivotally mounted on the frame, of a hook-shaped member and an actuating device disposed on the base for actuating the trolley pole structure from a longitudinal position to a lateral position relative to the car.

9. In a current collector adapted to be mounted on a car, the combination with a base and a trolley pole structure comprising a frame pivotally mounted on the base and a trolley pole pivotally mounted on the frame, of a pair of actuating hook-shaped members mounted on the base to engage the trolley structure and move it to either side of the car, said hook-shaped members being so disposed that either one of them will be out of engagement with the trolley structure when the other is in engagement therewith.

10. In a current collector adapted to be mounted on a car, the combination with a base and a trolley structure comprising a frame pivotally mounted on the base and a trolley pole pivotally mounted on the frame, of a pair of actuating hook-shaped members mounted on the base to engage the trolley structure and move it to either side of the car, and a track member disposed on the base to guide the engaging ends of the hook-shaped members into engagement with the trolley structure.

11. In a current collector adapted to be mounted on a car, the combination with a base, a frame pivotally mounted on the base, of a pair of trolley poles hinged on said frame in substantially parallel relation to each other, a trolley shoe having one end hinged to the outer end of one trolley pole and the other end hinged to the outer end of the other trolley pole whereby the shoe is constantly maintained in a substantially horizontal position, means for moving the trolley poles to one side of the car while they are down and means for raising the trolley poles after they have been moved to said side position.

12. In a current collector adapted to be mounted on a car, the combination with a base and a trolley pole structure comprising a frame pivotally mounted on the base and a pair of trolley poles pivotally mounted on the frame, of a pair of actuating hook-shaped members mounted on the base to engage the trolley structure and move it to either side of the car, a track member disposed on the base to guide the engaging ends of the hook-shaped members into engagement with the trolley structure, and means for preventing the raising of the trolley poles except when in their side positions and the moving of the trolley poles from their side positions so long as they are in their raised positions.

13. In a current collector adapted to be mounted on a car, the combination with a base, a frame pivotally mounted on the base, a trolley pole pivotally mounted on the frame, of a fluid-actuated device for moving the trolley pole to one side of the car, a second fluid-actuated device for moving the trolley pole to the other side of the car, a third fluid-actuated device for raising the trolley pole, a plurality of electrical devices for controlling the fluid-actuated devices, a plurality of switches for controlling the electrical devices, and means for interlocking the switches whereby only one fluid-actuating device for moving the trolley to the side of the car can be operated at one time.

14. In a current collector adapted to be mounted on a car, the combination with a base, a frame pivotally mounted on the base, and a pair of trolley poles pivotally mounted on said frame in substantially parallel relation to each other, of a trolley shoe pivotally connected to the outer end of each of said trolley poles and means for causing said shoe to lie longitudinally with the car when the trolley poles are down and in a longitudinal position relative to the car and for causing said shoe to assume a lateral position relative to the car when the trolley poles are raised.

15. In a current collector disposed to be moved in a horizontal plane and in a vertical plane, a plurality of actuating devices for moving the collector in a horizontal plane, said devices being disposed to move the collector from a neutral position in opposite directions, electromagnetic means for controlling the operation of each of said devices, and means for preventing the operation of another one of the devices when one of the devices is in operation.

In testimony whereof, I have hereunto subscribed my name this 12th day of January, 1928.

WILLIAM SCHAAKE.